United States Patent [19]

Schotel

[11] Patent Number: 5,624,702
[45] Date of Patent: Apr. 29, 1997

[54] LOW FAT SPREAD

[75] Inventor: Ronald A. Schotel, Vlaardingen, Netherlands

[73] Assignee: Van den Bergh Foods, Co., Division of Conopco, Inc., Lisle, Ill.

[21] Appl. No.: 541,574

[22] Filed: Oct. 10, 1995

Related U.S. Application Data

[63] Continuation of Ser. No. 79,659, Jun. 18, 1993, abandoned.

[30] Foreign Application Priority Data

Mar. 17, 1993 [EP] European Pat. Off. ........ 9320772

[51] Int. Cl.⁶ ............................................. A23D 7/015
[52] U.S. Cl. ......................... 426/603; 426/658; 426/804
[58] Field of Search ............................ 426/804, 603, 426/658

[56] References Cited

U.S. PATENT DOCUMENTS 5,153,020 10/1992 Singer et al. .................... 426/567
5,169,671 12/1992 Harada et al. .................. 426/658
5,501,869 3/1996 Buliga et al. ................... 426/658

FOREIGN PATENT DOCUMENTS

| | | |
|---|---|---|
| 0298561 | 1/1989 | European Pat. Off. |
| 0388572 | 9/1990 | European Pat. Off. |
| 0509707 | 10/1992 | European Pat. Off. |
| 62/61572 | 9/1985 | Japan. |
| WO93/06744 | 4/1993 | WIPO. |

OTHER PUBLICATIONS

European Search Report 15 Jul. 1993.

*Primary Examiner*—Jeanette Hunter
*Attorney, Agent, or Firm*—Gerald J. McGowan, Jr.

[57] ABSTRACT

A water-continuous spread having a structuring amount of oligofructoses, from 0.1 to 15 wt % of mono- or disaccharides and 0.1 to 7 wt. % of fat in the form of small globules or crystals having a volume weighted mean diameter of less than 20 μm.

7 Claims, No Drawings

LOW FAT SPREAD

This is a continuation application of Ser. No. 08/079,659, filed Jun. 18, 1993, now abandoned.

The present invention is concerned with spread products, in particular with spread products of low fat content, and processes for their preparation.

Many attempts have been made to formulate low fat spread products. Amongst the various reasons why such products are desired is the wish to reduce the caloric content of the spread and other dietetic considerations.

A substance that has widely been applied as a fat extender is water. This use of water has, for example, led to the introduction of so-called halvarines. If relatively high levels of water are used, often thickening agents and/or gelling agents are used for avoiding adverse effects of the high water level.

For example EP 298 561 (Unilever N.V.) describes the preparation of edible plastic dispersions not having a continuous fat phase, said composition including at least two gelling agents forming *two gel-forming compositions.

EP 509 707 discloses low fat spreads containing a combination of water soluble starch, alginate and ion source. Spreads according to this document may optionally contain 1 to 15% of a soluble vegetable fibre. An example of a suitable fibre for this purpose is INULIN which is for example marketed under the trade name FIBRULINE.

JP 267450/90 (Ajinimoto Co. Ltd.) discloses the use of polyfructan as a fat or oil substitute in food products. Preferred polyfructans are low caloric polysaccharides of the inulin type, which are mainly composed of beta-2,1-bonds).

Polysaccharides of the Inulin type are for example marketed under the trade name Raftiline™ and Fibruline™, these materials may advantageously be used in food products because they favourably contribute to the fibre content. A problem with the use of oligofructose materials is that when they are used in spreads, especially at high levels, sometimes they give rise to an undesired sweet off-taste. Also the appearance of spreads with relatively high levels of oligofructose materials is not always optimal.

It is the object of the present invention to formulate low fat spread products having a good flavour, texture and appearance. Surprisingly it has been found that these high quality, low fat products can be obtained if specific levels of oligofructose materials are used in combination with a narrowly defined level of mono- or disaccharides.

Accordingly the present invention relates to a water-continuous spread comprising:

(A) a structuring amount of oligofructoses; and (B) from 0.1 to 15 wt % of added mono- or disaccharides.

The improved taste of the product of the invention is especially surprising, because it appears that the addition of mono- or disaccharides to a spread containing structuring amounts of oligofructoses does not lead to an increase of the sweetness but rather to a decrease of the sweetness. Although applicants do by no means wish to be bound by this theory, it is believed that this taste-effect may be explained by the fact that the added mono- or disaccharides have a masking effect, due to which the sweet taste of the oligofructose material is masked and the final product is perceived as less sweet as the product without the added mono- or disaccharides.

For the purpose of the invention, preferably oligofructoses are used. Most preferred are materials containing one (terminal) sucrose unit, the remaining groups mainly being fructose units. Also the oligofructose is preferably of the beta-2,1 type, more specifically it is inulin which may be obtained from plants such as e.g. Compositae species and fructans obtained from various micro-organism as e.g. *Aspergillus sydowii*. Especially preferably inulin materials derived from Jerusalem artichoke of chicory are used. Preferably commercially available inulin materials like Raftiline or Fibruline are used. Other suitable oligofructoses are e.g. irisin and lycorisin.

The (weight) average degree of polymerisation of the oligofructose material is preferably from 6 to 100, more preferred 7 to 30, most preferred 8 to 25.

Compositions of the invention contain a structuring amount of oligofructoses. For the purpose of the invention, structuring amounts of oligofructoses are levels at which the oligofructose material is no longer soluble in the system, but is present as discrete particles which may provide structure to the product. The structuring amount of oligofructoses can suitably be determined by any suitable technique, for example by mixing all ingredients other than oligofructoses and then gradually adding oligofructoses while measuring the viscosity. At a certain level of oligofructoses a structure is formed by the oligofructoses. This may be evidenced e.g. by a change in melting temperature or an increase of viscosity. For the purpose of the invention any levels of oligofructoses above the level where a structure begins to form are referred to a structuring amounts.

The structuring amount of oligofructoses may depend on the type of oligofructoses used and the remaining ingredients of the product. For inulin type oligofructoses, in particular those derived from Jerusalem artichoke or chicory, the structuring amount is generally more than 15 wt %, for example 17 to 70 wt %, more preferred 20 to 50 wt %. For other oligofructoses similar structuring amounts apply.

Accordingly in a second embodiment of the invention there is provided a water-continuous spread comprising:

(A) more than 15 wt % of oligofructoses; and (B) from 0.1 to 15 wt % of added mono- or disaccharides.

Preferably the particle size of the oligofructose agglomerates in the spread is in the order of magnitude of 0.5–20, preferably 1–5 micrometer which can be effected by suitable processing. The size of the primary oligofructose particles preferably is in the order of magnitude of 50 to 500 nm.

Compositions of the invention contain from 0.1 to 15 wt % of added mono- or disaccharides, more preferably 0.5 to 10 wt %, most preferred 0.7 to 5 wt %. For the purpose of the invention added mono- or di-saccharides are those mono- or disaccharides which are added on top of the mono- or disaccharides which may be present in the oligofructose material.

Suitable mono-saccharides are for example Ribose, Arabinose, Xylose, Lyxose, Sorbitol, Glucose, Mannose and Fructose. Suitable disaccharides are for example Isomaltose, Lactose, Maltose, Melibiose and Sucrose. Preferably the added mono- or disaccharides are other mono- or disaccharides than those which may be present in the oligofructose materials (mainly glucose, fructose and sucrose). Also preferably disaccharides are used, most preferred is the use of Lactose.

Lactose can suitably derived from a dairy source, for example from whole milk, semi-skimmed milk, skimmed milk, (cultured) buttermilk, butter milk powder, skimmed milk powder, (Greek) yoghurt, quark, (low fat) fromage frais, (low fat) cottage cheese, butter, (Philadelphia) cream cheese, (double) cream, Ricotta cheese etc. In a preferred embodiment of the invention the lactose is derived from dairy cream or cream cheese.

In another preferred embodiment of the invention the disaccharide is derived from non-dairy creams. Generally non-dairy creams contain lactose as disaccharide material.

Compositions of the invention may optionally comprise from 0.1 to 7 wt % of fat, more preferred the level of fat is more than 0.5 wt % and less than 4 wt %, most preferred are fat levels from 1 to 3 wt %.

Throughout this specification the terms oil and fat are used interchangeably. They are meant to include triglycerides of natural or synthetic origin such as soybean oil, sunflower oil, palm oil, fish oil, rapeseed oil, coconut oil, and hydrogenated, fractionated and/or interesterified triglyceride mixtures as well as edible substances that are physically similar to triglycerides such as waxes, e.g. jojoba oil and poly fatty acid esters of mono- or di-saccharides, and that can be used as replacement for or in admixture with triglycerides.

Preferably the fat is present in the form of small fat globules or crystals, having a volume weighted mean diameter of less than 20 μm, more preferred from 0.1 to 5 μm, most preferred from 0.5 to 2 μm. The presence of these small fat particles in low fat spreads of the invention has the distinct advantage of providing an improved appearance to the product.

In a very preferred embodiment of the invention at least part of the fat is dairy fat. Preferably at least 10 wt % based on the total weight of the fat is dairy fat, more preferred more than 50 wt %, most preferred more than 90 wt % or even 100 wt %. The dairy fat can be derived from any dairy source as mentioned above. Especially preferably the dairy fat is derived from dairy cream or cream cheese.

In another preferred embodiment of the invention the fat is derived from non-dairy creams.

The use of fat sources wherein the ratio of fat to protein is high, for example butterfat, cream cheese and dairy cream or non-dairy cream, is preferred. These materials provide an excellent flavour to the product. Preferably fat sources are used, wherein the weight ratio of fat to protein is more than 5:1, more preferred more than 10 1, most preferred from 50:1 to 1000:1.

For optimising the flavour of the spreads of the invention it is especially preferred that the disaccharide material or the dairy fat is incorporated in the product by using at least 5 wt % of a dairy ingredient in the spread. The optimum level of dairy ingredients will be dependent on the type and saccharide or fat level of the dairy product. Also combinations of dairy products may be used.

If whole milk, semi skimmed milk, skimmed milk or combinations thereof are used, the total level thereof is preferably from 40 to 85 wt % of the composition, more preferred 50–80 wt %, most preferred 55–80 wt %.

If yoghurt, quark, cottage cheese, butter fat, cream, cream cheese or fromage frais or a combination thereto is used, the total level is preferably from 2–40 wt %, more preferred 5–30 wt %. Under some circumstances it may be advantageous to use a mixture of milk and these ingredients, for example in weight ratios between 20:1 and 2:1, the total level of yoghurt/quark/cottage cheese/fromage frais/cream/cream cheese and milk being from 60–85 wt %.

If non-dairy cream is used, the preferred level is from 2 to 40 wt %, more preferred 5 to 30 wt %.

Especially preferred is the combined use of cream (dairy or non-dairy) with butter fat, for example in a weight ratio of 20:1 to 1:1.

Preferably spreads of the invention are plastic in the sense that they can be spread onto bread without tearing the bread. Generally plastic spreads will have a stress strain relation with a maximum stress occurring at strain of 0.001–0.5 (preferably 0.001 to 0.3), the maximum stress at this strain being 0.01–100 kPa and with a ratio of plastic stress and the maximum stress of 0.1 to 1. A suitable method for determining these values is given in EP 298 561.

In addition to the above mentioned ingredients, spreads of the invention may comprise a number of optional ingredients such as flavouring, salt, preservatives, acidifiers, vitamins, colouring materials etc.

Preferably the level of flavouring materials (other than those which are incorporated through the dairy ingredients) is less than 0.5 wt %, for example 0.01 to 2 wt %. Preferably the level of salt (sodium chloride) is from 0–4 wt %, more preferred 0.1 to 3 wt %, most preferred 0.5 to 1.2 wt %. Preservatives are preferably incorporated at a level of 0–4 wt %, more preferred 0.01 to 1 wt %, most preferred 0.05 to 0.3 wt %. Especially preferred is the use of potassium sorbate. A preferred colouring material is carotene; preferred levels of colouring material are from 0–1 wt %, more preferred 0.01 to 0.2 wt %. Acidifiers may be incorporated to bring the pH of the product to the desired level, preferably the pH of the product is from 3 to 10, more preferred 3.5 to 7. A suitable acidifier is for example lactic acid or citric acid.

Another optional ingredient which may be present in compositions of the invention are proteins. Preferably the protein level in spreads of the invention is from 0.5 to 15 wt %, more preferred, 2 to 6 wt %, most preferred 2.5 to 4%. In an especially preferred embodiment of the invention the protein are partially or wholly obtained from dairy sources. In another preferred embodiment of the invention the protein is wholly or partially a vegetable protein, especially soy bean protein. For example 4-f mixtures of these ingredients are used suitable weight ratios of dairy protein to vegetable protein may for example be from 10:1 to 1:10.

The spread may further containing small particles such as herbs and vegetables. The total level thereof will generally be less than 10 wt %.

Spreads of the invention will generally comprise fairly high levels of water, say from 50 to 84.9 wt % of the composition, more preferred 60 to 80 wt %, most preferred 65 to 75 wt %. Water may be incorporated as such, or as part of the other ingredients such as milk etc. Spreads of the invention are water-continuous in the sense that they comprise a continuous aqueous phase. Water-continuous spreads can readily be distinguished from fat-continuous spreads by virtue of conductivity measurements.

Spreads of the invention can suitably be used as bread spreads to replace e.g. margarine or halvarine, but they can also suitable be used as flavoured spread, for example cheese spreads, meat spreads, nut spreads, sweet spreads or vegetable spreads.

Spreads of the invention may be prepared by any suitable method for the preparation of water-continuous spread products. A preferred method however involves the mixing of the ingredients, optionally followed by pasteurisation and homogenisation, followed by cooling in one or more scraped surface heat exchangers (A-units) to a temperature of 0° to 10° C., optionally followed by processing through one or more C-units. Pasteurisation is especially preferred for extending the keepability of the product. Homogenisation is preferred for effecting the formation of small fat globules to enhance the appearance of the spread. After preparation the spreads are generally packed in wrappers or containers, generally tubs with a content of 2–1000 g will be used, especially 5, 10, 15, 250 or 500 g. Preferably the packed product is stored at refrigerator temperatures.

EXAMPLE I

The following compositions were made:

| Ingredient wt % | A | B | C | D |
|---|---|---|---|---|
| Inulin | 33 | 33 | 33 | 33 |
| Butter fat | — | 1 | — | — |
| Non-dairy cream | 12 | 12 | — | — |
| Dairy cream | — | — | 12 | — |
| Potassium sorbate | 0.12 | 0.12 | 0.12 | 0.12 |
| Salt | 0.8 | 0.8 | 0.8 | 0.8 |
| Flavouring | 150 ppm | 150 ppm | 150 ppm | 150 ppm |
| Lactid acid | to pH 4.8 | to pH 4.8 | to pH 4.8 | to pH 4.8 |
| Water | balance | balance | balance | balance |

The inulin was Raftiline LS ex Tiense Sulker raffinaderij The non-dairy cream was Lactofil classic containing 26.7 wt % fat, 2 wt % protein and 19.9 wt % lactose. The dairy cream contained 45 wt % fat.

The product was prepared as follows: the cream and water were mixed at 60° C., cooled to 45° C. whereafter the pH was adjusted and the remaining ingredients were added.

Products A–C (according to the invention) had an improved taste and appearance when compared to product D (comparison).

EXAMPLE II

A spread of the following composition was prepared.

| Ingredient | Wt % |
|---|---|
| Raftiline LS | 30 |
| gelling starch | 5 |
| cream (40% fat) | 7 |
| gelatin | 0.25 |
| CMC (7 mf ex Hercules) | 0.07 |
| NaCl | 0.8 |
| potassium sorbate | 0.2 |
| TiO2 | 0.2 |
| flavouring | 100 ppm |
| water | balance |
| pH | 5.2 |

The method of preparation was as follows: The starch was solubilized in water at 850° C. and kept at this temperature for 10 minutes. The solution was cooled to 650° C. The CMC and 0.07% of the Raftiline LS were premixed and added. The mixture was further cooled to 600° C., the cream was added. The remaining ingredients except for the flavour were added at 600° C. The pH was set to 5.2 using a 10% tactic acid solution. Finally the flavours were added.

(*) oligofructose ex Tiense Sulker raffinadery.

(**) A modified maltodextrin starch (6110=97-2 ex National Starch). This starch is a blend of modified food starches, having rheological properties as follows: $Gl_{max}$ is 5.0 after complete dispersion in water (17.2%) and a log $Gl_{max}$ of 4.7 (log of ½ G') at 6486 seconds after dispersion.

I claim:

1. A water-continuous spread comprising:

(A) a structuring amount of oligofructose;

(B) from 0.1 to 15 wt. % of mono- and/or disaccharide; and (C) from 0.1 to 7 wt. % of fat, wherein the fat is present in the form of small globules or crystals having a volume weighted mean diameter of less than 20 µm.

2. A spread according to claim 1, wherein the level of oligofructoses is more than 15 wt %, more preferred 17 to 70 wt %, most preferred 20 to 50 wt %.

3. The spread according to claim 1, wherein the fat is present in the form of small globules or crystals, having a volume weighted diameter from 0.1 to 5 microns.

4. The spread according to claim 1, wherein the fat is present in the form of small globules or crystals, having a volume weighted diameter from 0.5 to 2 microns.

5. The spread according to claim 1, which comprises from 0.5 to 4% wt. of fat.

6. The spread according to claim 1, which comprises from 1 to 3% wt of fat.

7. The spread according to claim 1 wherein the spread has a stress strain relation with a maximum stress occurring at a strain of 0.001–0.5, the maximum stress at this strain being 0.01–100 kPa and with a ratio of plastic stress and the maximum stress of 0.1 to 1.

* * * * *